United States Patent [19]
Park

[11] Patent Number: 5,425,685
[45] Date of Patent: Jun. 20, 1995

[54] CONTINUOUS VARIABLE-RATIO TRANSMISSION

[76] Inventor: Bret J. Park, 4083 Carrie Dr., West Valley, Utah 84120

[21] Appl. No.: 178,104

[22] Filed: Jan. 6, 1994

[51] Int. Cl.⁶ ............................................. F16H 15/00
[52] U.S. Cl. ........................................ 476/55; 74/348
[58] Field of Search ............................. 74/348; 476/55

[56] References Cited

U.S. PATENT DOCUMENTS

| | | |
|---|---|---|
| Re. 23,728 | 10/1953 | Teigman . |
| 861,069 | 7/1907 | Wood . |
| 1,055,677 | 3/1913 | Sparks . |
| 1,191,771 | 7/1916 | Delacour . |
| 1,359,950 | 11/1920 | Beauvais . |
| 1,443,991 | 2/1923 | Hayden ................................. 476/55 |
| 3,158,041 | 11/1964 | Rae . |
| 3,810,401 | 5/1974 | Edlich .................................. 74/691 |

*Primary Examiner*—Charles A. Marmor
*Assistant Examiner*—David M. Fenstermacher
*Attorney, Agent, or Firm*—Thorpe, North & Western

[57] ABSTRACT

A continuous variable-ratio transmission includes a first rotatable member whose exterior surface of revolution about its axis of rotation is defined by a tractrix curve. A rotatable conical member is mounted upon a first shaft and frictionally engages with the tractrix surface. The second rotatable member is moveable along the tractrix surface and has a shape such that for any position along the tractrix surface, the ratio of any two contacting circumferences of the conical surface and the tractrix surface is substantially equivalent to the ratio of any other two contacting circumferences. A first gear of a gear assembly is operably connected to the first shaft. A rotatable splined shaft extends axially through a second gear of the gear assembly and engages with a splined interior surface thereof to thereby permit the gear assembly to move along the splined shaft with movement of the conical member along the tractrix surface. The axis of rotation of the splined shaft is maintained at a substantially consistent angle relative to a tangent line at a friction point on the tractrix surface for any position of the conical member along the tractrix surface to thereby maintain contact between the conical surface and the tractrix surface along substantially an entire length of the conical surface at any position.

20 Claims, 2 Drawing Sheets

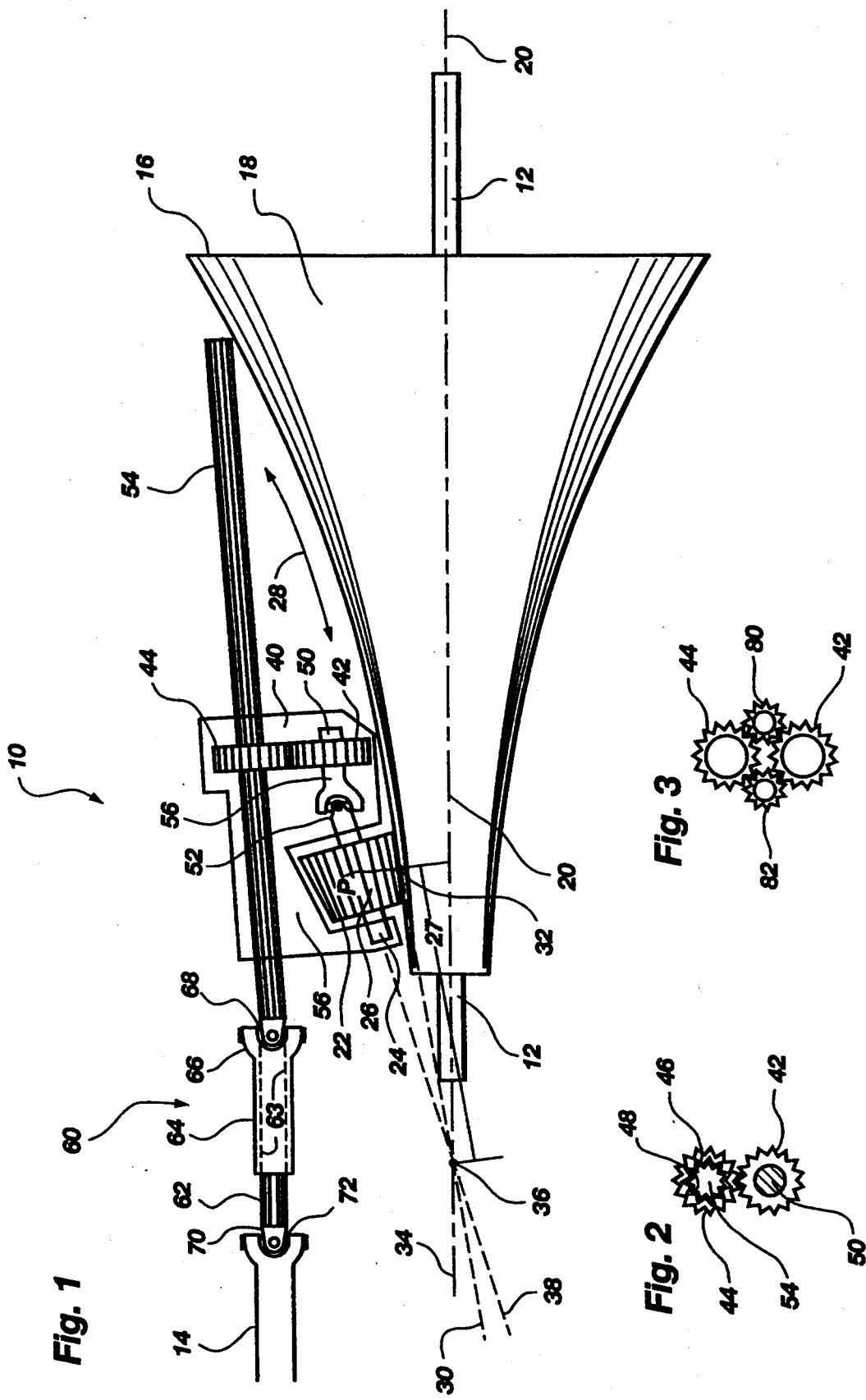

CONTINUOUS VARIABLE-RATIO TRANSMISSION

BACKGROUND OF THE INVENTION

1. The Field of the Invention

The present invention relates generally to vehicle transmissions. More particularly, it concerns a continuous, variable-ratio transmission including a rotational wheel having an exterior surface of revolution defined by a tractrix curve.

2. The Background Art

Transmission devices are known in the field to convert and transmit the power generated by an engine to comply with the load placed on the output shaft. Prior art transmission devices utilize a hand-operated shift lever and foot-operated clutch to enable manually shifting among various gear ratios of the transmission. Automatic transmissions are available which do not require a clutch or shift lever. It is desirable to achieve a transmission having a continuous, infinite range of gear ratios to more efficiently respond to the various loads placed on the output shaft.

It is known in the art to provide a variable ratio transmission operating on the principle of a rotating conical surface in frictional engagement with a smaller wheel which moves along the conical surface. As the smaller wheel is moved along the conical surface, its rate of revolution relative to said conical surface changes because of the changing diameter of said conical surface. By varying the position of the smaller wheel along the conical surface, various speed ratios are thereby achieved between the two surfaces.

If the smaller wheel is provided with a cylindrical surface, shear stresses therein are unavoidable. These shear stresses can be explained by the concept that the circumference of the cylinder at its front and rear edges is the same, but these circumferences are forced to frictionally and rotatably engage with different-sized circumferences on the conical surface. The wider portions of the conical surface travel faster that the narrower portions. Since equal circumferences on the cylinder respectively engage different-sized circumferences on the conical surface necessarily travelling at different speeds, some portions of the cylinder are forced to slip and rub against the faster conical portions resulting in shear forces.

It is known to overcome this problem by providing the smaller wheel with a conical surface, instead of a cylindrical surface, in which the ratio between the contacting circumferences is the same at any point of contact between the smaller wheel and the conical surface. However, this condition will occur in only one given position. If the smaller wheel is shifted away from said given position, the ratios between the contacting circumferences will vary, causing the unwanted shear stresses.

It was discovered that such unwanted shear stresses can be substantially eliminated by changing the larger conical surface into a tractrix surface defined by a tractrix curve. The phrase "tractrix curve" as used herein refers to a curve having the property that a tangent to the curve at any point is always of equal length when measured between such point and its intersection with the X axis. In U.S. Pat. No. 3,158,041 (issued to Rae on Nov. 24, 1964), inventor Rae disclosed a tractrix surface in frictional engagement with a smaller, conical surface. However, there are many practical difficulties involved in transferring a useful amount of power from these frictionally engaging surfaces, and the prior art attempts to do so are fraught with disadvantages. For example, it is difficult to mechanically move the conical wheel along the tractrix surface and maintain contact therebetween along substantially an entire length of said conical surface. Moreover, prior art attempts to maintain such contact have required complex gear assemblies which require a larger transmission housing, and varying orientations between gear members which result in a less efficient power transfer. The prior art teaches moving the tractrix surface while maintaining a stationary conical wheel. The mechanics of doing so require more space to accommodate moving the larger tractrix surface along an arcuate movement path.

OBJECTS AND SUMMARY OF THE INVENTION

It is therefore an object of the present invention to provide a transmission utilizing a rotatable tractrix surface to accomplish variable transmission gear ratios.

It is an additional object of the invention to provide such a transmission capable of maintaining contact between a conical surface and the tractrix surface along substantially an entire length of said conical surface, for any position of said conical surface along the tractrix surface.

It is another object of the invention to provide such a transmission wherein the tractrix surface is maintained in a fixed location.

It is a further object of the invention to provide such a transmission capable of transferring useful amounts of power from/onto the tractrix surface with a minimum of gear apparatus.

The above objects and others not specifically recited are realized in an illustrative embodiment of a continuous variable-ratio transmission. The transmission includes a first rotatable member whose exterior surface of revolution about its axis of rotation is defined by a tractrix curve. A rotatable conical member is mounted upon a first shaft and frictionally engages with said tractrix surface. The second rotatable member is moveable along said tractrix surface and has a shape such that for any position along said tractrix surface, the ratio of any two contacting circumferences of the conical surface and the tractrix surface is substantially equivalent to the ratio of any other two contacting circumferences. A first gear of a gear assembly is operably connected to the first shaft. A rotatable splined shaft extends axially through a second gear of the gear assembly and engages with a splined interior surface thereof to thereby permit the gear assembly to move along said splined shaft with movement of the conical member along the tractrix surface. The axis of rotation of the splined shaft is maintained at a substantially consistent angle relative to a tangent line at a friction point on the tractrix surface for any position of said conical member along said tractrix surface to thereby maintain contact between the conical surface and the tractrix surface along substantially an entire length of said conical surface at said any position.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 illustrates a side, schematic view of a continuous variable-ratio transmission, made in accordance with the principles of the present invention;

FIG. 2 illustrates a schematic view as a gear assembly portion of the transmission of FIG. 1;

FIG. 3 illustrates an alternative embodiment of the gear assembly of FIG. 2.

DETAILED DESCRIPTION OF PRESENTLY PREFERRED EMBODIMENTS

Figure 4:
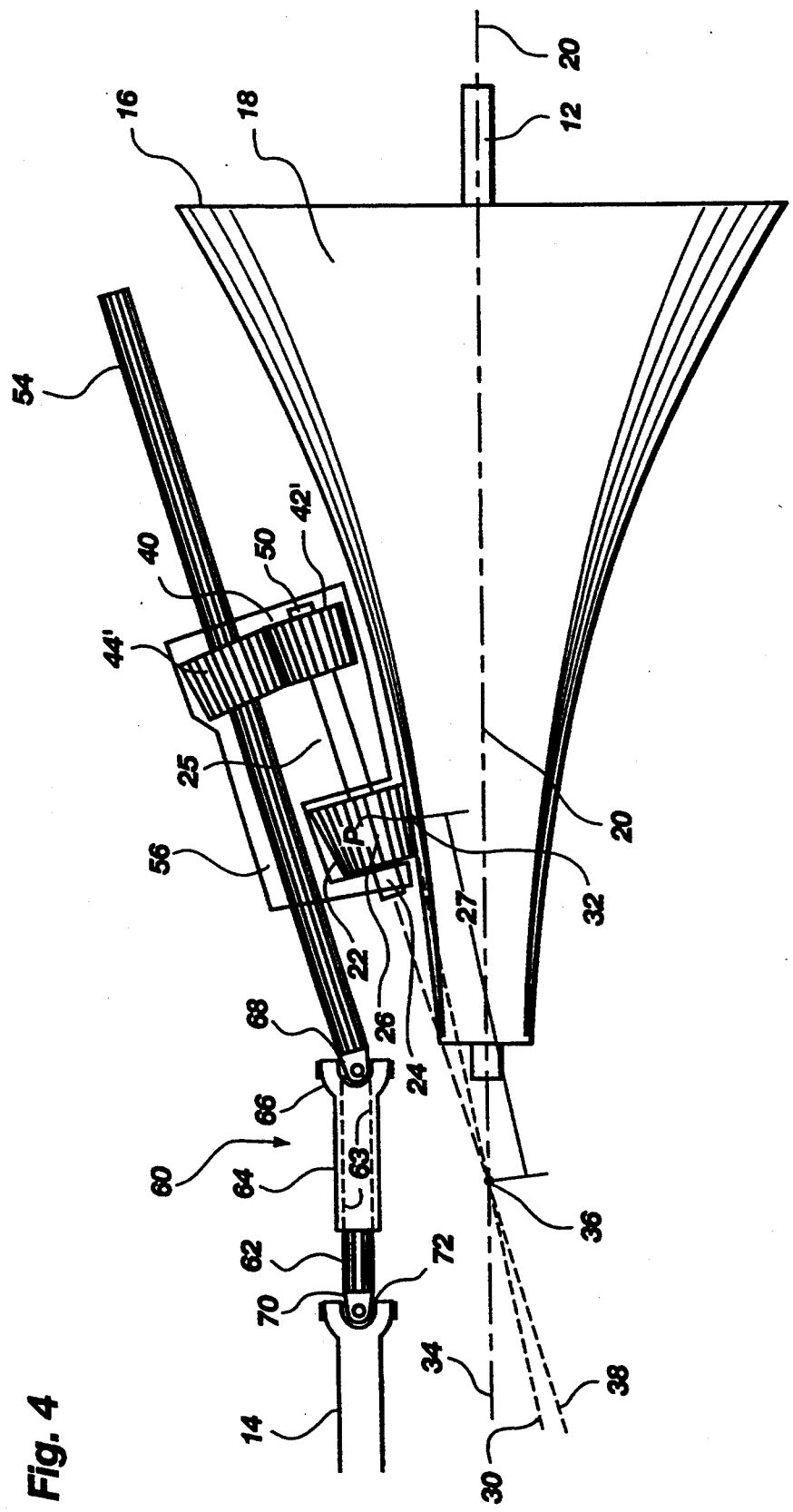
FIG. 4 illustrates a side, schematic view of an alternative embodiment of the transmission of FIG. 1.

Reference will now be made to the drawings wherein like structures will be provided with like reference numerals.

FIG. 1 illustrates the main features of a continuous variable-ratio transmission, designated generally at 10. The transmission 10 includes first and second input/output shafts and 14, respectively. Either of the shafts 12 and 14 can operate as either an input shaft or an output shaft, hence the term "input/output shaft". Mounted upon the first input/output shaft 14 is a rotatable tractrix member 16 having an exterior tractrix surface of revolution 18 about an axis of revolution 20 of said tractrix member 16. Said tractrix surface 18 is defined by a tractrix curve. The phrase "tractrix curve" as used herein refers to a curve having the property that a tangent to the curve at any point is always of equal length when measured between such point and its intersection with the X axis, or axis 20 as in FIG. 1. Those skilled in the relevant mathematics will appreciate that if k represents the distance between a point on the tractrix surface 18 and the axis 20 along a line perpendicular to said axis 20, the equation of the tractrix curve by which the tractrix surface of revolution 18 is defined, if axis 20 represents the X axis, is given by:

$$x = \pm k \left[ \cos h^{-1} \frac{k}{y} - \sqrt{1 - \left(\frac{y}{k}\right)^2} \right]$$

Alternatively, if axis 20 represents the Y axis, the equation of the tractrix curve is given by:

$$y = \sec h^{-1}(x) - \sqrt{1 - x^2}$$

Another way to describe a tractrix curve is to describe the path of the rear wheels of an automobile turning a corner angle of ninety-degrees. The path of the rear wheels creates a tractrix curve in trying to follow the front wheels.

The transmission 10 further includes a rotatable friction wheel 22 mounted upon an intermediate shaft member 24. The friction wheel 22 has a substantially conical exterior surface of revolution 26 in frictional engagement with said tractrix surface 18. The friction wheel 22 is moveable along the tractrix surface 18 in the directions designated by arrow 28, which indicates opposing, axial directions. The conical surface 26 has a shape such that a tangent line 30 on the tractrix surface 18 at a point 32 of friction between a given point P on said conical surface 26 and said tractrix surface 18, intersects a central axis 34 of rotation of the tractrix member 16 at a same point 36 of intersection between said central axis 34 of the tractrix member 16 and a central axis 38 of the friction wheel 22. Reference numeral 27 represents the length of the tangent line 30 between the given point P and the central axis 34 of the tractrix surface 18, which will remain constant for any operable position of the friction wheel 22 along the tractrix surface 18. The shape of the conical surface 26 is such that substantially no shear forces are developed between the friction wheel 22 and the tractrix surface 18.

The shape of the conical surface 26 can also be described in terms of ratios of contacting circumferences of the tractrix surface 18 and the conical surface 26. The conical shape is such that a ratio of a first circumference of the conical surface 26 to a circumference of the tractrix surface 18 at a point of contact with said first circumference is substantially equivalent to a ratio of a second circumference of the conical surface 26 to a circumference of the tractrix surface 18 at a point of contact with said second circumference, for any operable position of the friction wheel 22 along said tractrix surface 18. This configuration operates to substantially eliminate shear forces between the friction wheel 22 and the tractrix surface 18.

A gear assembly 40 includes a first gear 42 having exterior teeth operably meshed with exterior teeth of a second gear 44. The gear assembly 40 is shown in greater detail in FIG. 2. The second gear 44 includes a passage 46 defined by a splined interior surface 48. The first gear 42 is mounted upon a shaft member 50 to form an integral part thereof. A universal joint 52 as known in the art connects the shaft member 50 with the intermediate shaft member 24, such that the first gear 42 is confined to continuous rotation with said intermediate shaft member 24 about an axis oriented at an inclined angle relative to the axis of rotation of said intermediate shaft member 24. A first splined shaft member 54 extends axially through the second gear 44 and is in meshing engagement with the splined interior surface 48 thereof. This permits axial movement of the gear assembly 40 along the first splined shaft member 54 with movement of the friction wheel 22 along the tractrix surface 18.

Holding structure 56 operates to hold together the gear assembly 40 with the first splined shaft member 54 and the friction wheel 22. The holding structure 56 can be any structure capable of maintaining substantially the same positional relationship between the first splined shaft member 54, the second gear 44, the first gear 42 and its shaft member 50, and the intermediate shaft member 24, and hence the friction wheel 22. The first splined shaft member 54 is operably connected to the second input/output shaft 14 with a slidable sleeve/shaft device 60 as known in the field. The sleeve/shaft device 60 includes a second splined shaft member 62 slidably engaged with a splined interior surface 63 of a sleeve member 64 such that said splined shaft member 62 is confined to continuous rotation with said sleeve member 64. The sleeve/shaft device 60 is operably connected at a first end 66 thereof to the first splined shaft member 54 by a universal joint 68. An opposing second end 70 of said sleeve/shaft device 60 is configured for attachment to the second input/output shaft 14 by a universal joint 72.

A main purpose of the combination of the holding structure 56, the sleeve/shaft device 60, and the universal joints 52, 68 and 72, is to maintain a substantially consistent angle between a central axis of rotation of said first splined shaft member 54 and said tangent line 30 on the tractrix surface 18, for any operable position of said friction member 22 along said tractrix surface 18. This operates to maintain contact between the conical surface 26 and the tractrix surface 18 along substantially the entire length of the conical surface 26 at said any operable position, such that said axis of rotation of said first splined shaft member 54 moves through various angles of inclination relative to the second input/output shaft means 14. The sleeve/shaft device 60 particularly operates in combination with the universal joints 68 and 72 to operably connect the first splined shaft member 54 to the second input/output shaft 14 such that said first splined shaft member 54 is confined to continuous rotation with said second input/output shaft 14 at said various angles of inclination relative to said second input/output shaft 14.

It will be appreciated that many practical difficulties arise in attempts to transfer power from the rotatable tractrix surface 18. One major obstacle is simply maintaining the friction wheel 22 against the tractrix surface 18 at the various operable positions. Prior art attempts to do so have required that the tractrix surface 18 be moveable in an axial direction, and that a contacting friction wheel be stationary. This requires extensive gear assemblies which require a larger transmission housing in order to accommodate the necessary extensive gear assemblies and the motions of the tractrix surface 18 because it is much larger than the smaller contacting friction wheel. The prior art configurations also require varying orientations between gear members which result in a less efficient power transfer. The present invention avoids these difficulties and disadvantages by keeping stationary the rotating tractrix surface 18.

The concept of maintaining a substantially consistent angle between a central axis of rotation of said first splined shaft member 54 and said tangent line 30 on the tractrix surface 18, for any operable position of said friction member 22 along said tractrix surface 18, is one of applicant's discoveries and permits the friction wheel 22 to remain in frictional contact with the tractrix surface 18 for various operable positions therebetween. The universal joint 52 permits the gear assembly 40 to transfer power from the friction wheel 26 to the first splined shaft member 54, despite the intermediate shaft member 24 being at an angle relative to the respective axes of the gears 42 and 44. The sleeve/shaft device 60 and the universal joints 68 and 72 permit the first splined shaft member 54 to maintain the same positional orientation relative to the tangent line 30 for any operable position of the friction wheel 22 on the tractrix surface 18. It will be appreciated that the apparatus described allows power to be transferred efficiently from the tractrix surface 18 with a minimum of gearing and space necessary to accommodate axial movement of friction members.

It is to be understood that the gear assembly 40 can comprise any number of different gear configurations. FIGS. 1-2 illustrate a gear assembly made up of only the two gears 42 and 44 which have straight teeth, i.e. non-bevel gears, although any number of gears can be used in the gear assembly 40. For example, FIG. 3 illustrates that gears 80 and 82 can be used, such that gear 42 only meshes with the gears 80 and 82 and not with gear 44. Further, FIG. 4 illustrates that the first and second gears 42' and 44' can comprise bevel gears. The universal joint 52 may be eliminated in this embodiment, such that the angle between the axis of rotation of the first gear 42' and the axis of rotation of the intermediate shaft member 24 is substantially zero and the shafts 24 and 50 are integrally joined to form shaft portion 25. The important consideration is that the angle between the first splined shaft 54 and the tangent line 30 remain substantially constant for any operable position of the friction member 22 on the tractrix surface 18, i.e. simultaneously with the conical surface 26 being maintained in frictional engagement with the tractrix surface 18 along substantially an entire length of the conical surface 26. This substantially consistent angle is preferably zero degrees, i.e. it is preferable that the first splined shaft 54 be substantially parallel with a tangent line 30 on the tractrix surface 18 for any operable position of the friction wheel 22 thereon.

A preferred orientation of the first splined surface 54 relative to the tractrix surface 18 may also be described as follows. The first splined shaft member 54 is positioned such that an imaginary straight line which is substantially perpendicular to the tangent line 30 a point 32 of friction between a given point P on said conical surface 26 and said tractrix surface 18, intersects the axis of rotation of the first splined shaft member 54 at substantially the same point thereon for any operable position of the friction wheel 22 along the tractrix surface 18, such that the distance between said point 32 of friction and said point of intersection is substantially constant for said any operable position of the friction wheel 22 along the tractrix surface 18.

It is preferred that the conical surface 26 be slightly crowned to provide a more complete surface contact with the tractrix surface 18. However, a slightly crowned surface 26 will not differ materially from a substantially conical surface. It is also preferred to use the non-bevel gears 42 and 44, such that their respective axes of rotation are in substantial parallel orientation with the axis of rotation of the first splined shaft member 54. The gear assembly 40 may alternatively comprise three or more gears having respective axes of rotation which are substantially parallel with the axis of rotation of the first splined shaft member 54.

In accordance with the present invention, other structure and apparatus may be used as known in the art to achieve a feasible, operable embodiment. There will be accordingly provided a means for varying the speed of the friction wheel 22 by moving it axially along the tractrix surface 18. As the friction wheel 22 is thus moved, the holding structure 56 cooperates with the sleeve/shaft device 60 and the universal joints 52, 68 and 72 to move the first splined shaft member 54 through various angular orientation relative to the second input/output shaft 14, such that said first splined shaft member 54 remains confined to rotation with said input/output shaft 14.

The present invention represents a significant advance in the field of transmissions. The invention may be used in any setting requiring the advantages thereof, including automobiles, construction vehicles, heavy equipment moving vehicles and so forth. It is noted that many of the advantages of the present invention accrue due to the maintaining of a consistent positional orientation between the first splined shaft member 54 and the tangent line 30 for any operable position of the friction wheel 22 along the tractrix surface 18. This discovery not only permits frictional engagement between the friction wheel 22 and the tractrix surface 18 to be maintained, it allows for fewer gears and a resulting simpler construction and smaller transmission housing. The problems noted above and others not discussed are overcome to a significant degree by the present invention. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A continuous variable-ratio transmission comprising:
    a first rotatable member having an exterior tractrix surface of revolution about its axis of rotation defined by a tractrix curve, said first rotatable member being configured for mounting upon first input-/output shaft means and confined to continuous rotation therewith;
    a second rotatable member mounted upon intermediate shaft means and having a substantially conical exterior surface of revolution in frictional engagement with said tractrix surface, said second rotatable member being moveable along an axial direction on said tractrix surface and having a shape such that a tangent line on the tractrix surface at a point of friction between a given point on the conical surface and said tractrix surface intersects a central axis of the first rotatable member at a same point of intersection between said central axis of the first rotatable member and a central axis of said second rotatable member, for any operable position of said second rotatable member along said tractrix surface;
    a gear assembly comprising two or more operably meshing gears, including a first gear, and a second gear having a passage defined by a splined interior surface;
    first connecting means for operably connecting the first gear to the intermediate shaft means such that said first gear is confined to continuous rotation therewith about an axis oriented at an angle relative to the axis of rotation of said intermediate shaft means; and
    first splined shaft means extending axially through the second gear and being in meshing engagement with the splined interior surface thereof to thereby permit axial movement of the gear assembly along said first splined shaft means with movement of the second rotatable member along the tractrix surface, said first splined shaft means being configured to be operably connected to second input/output shaft means.

2. The transmission as defined in claim 1, further comprising:
    positioning means for maintaining a substantially consistent angle between a central axis of rotation of said first splined shaft means and said tangent line on the tractrix surface for any operable position of said second rotatable member along said tractrix surface to thereby maintain contact between the conical surface and the tractrix surface along substantially an entire length of said conical surface at said any operable position, such that said axis of rotation of said first splined shaft means moves through various angles of inclination relative to said second input/output shaft means, said positioning means including second connecting means for operably connecting the first splined shaft means to said second input/output shaft means such that said first splined shaft means is confined to continuous rotation therewith at said various angles of inclination relative to said second input-/output shaft means.

3. The transmission as defined in claim 1 wherein the substantially conical exterior surface of the second rotatable member is slightly crowned to thereby provide a more complete surface contact.

4. The transmission as defined in claim 1 wherein the gears of the gear assembly consist of said first gear and said second gear such that exterior gear teeth of said first gear mesh with exterior gear teeth of said second gear, wherein respective axes of rotation of said first and second gears are in substantial parallel orientation with the axis of rotation of the first splined shaft means.

5. The transmission as defined in claim 1 wherein the gears of the gear assembly comprise three or more gears having respective axes of rotation which are in substantial parallel orientation with the axis of rotation of the first splined shaft means.

6. The transmission as defined in claim 1 wherein the first and second gears each comprise a gear having exterior bevel gear teeth about an outer perimeter thereof.

7. The transmission as defined in claim 2 wherein the positioning means includes means for maintaining the respective axes of rotation of the first splined shaft means, the gears of the gear assembly, and the second rotatable member in substantially fixed positions relative to each other.

8. The transmission as defined in claim 7 wherein the second connecting means comprises a slidable sleeve-/shaft device including a splined shaft member slidably engaged with a splined interior surface of a sleeve member such that said splined shaft member is confined to continuous rotation with said sleeve member, said sleeve/shaft device being operably connected at a first end thereof to the first splined shaft means by a universal joint, an opposing second end of said sleeve/shaft device being configured for attachment to the second input/output shaft means by a universal joint.

9. The transmission as defined in claim 1 wherein the first connecting means comprises a shaft member upon which the first gear is mounted to form an integral part thereof, and a universal joint connecting said shaft member with the first shaft means.

10. The transmission as defined in claim 2 wherein the positioning means operates to position the splined first shaft means such that an imaginary straight line which is substantially perpendicular to said tangent line at said point of friction intersects the axis of rotation of the first splined shaft means at substantially the same point thereon for any operable position of said second rotatable member along said tractrix surface, such that the distance between said point of friction and said point of intersection is substantially constant for any operable position of said second rotatable member along said tractrix surface.

11. The transmission as defined in claim 1 wherein the central axis of rotation of said first splined shaft means and said tangent line on the tractrix surface are substantially parallel for any operable position of said second rotatable member along said tractrix surface.

12. A continuous variable-ratio transmission comprising:
   a first rotatable member having an exterior tractrix surface of revolution about its axis of rotation defined by a tractrix curve, said first rotatable member being configured for mounting upon first input/output shaft means and confined to continuous rotation therewith;
   a second rotatable member mounted upon intermediate shaft means and having a substantially conical exterior surface of revolution in frictional engagement with said tractrix surface, said second rotatable member being moveable along an axial direction on said tractrix surface and having a shape such that a ratio of a first circumference of said second rotatable member to a circumference of said tractrix surface at a point of contact with said first circumference is substantially equivalent to a ratio of a second circumference of said second rotatable member to a circumference of said tractrix surface at a point of contact with said second circumference, for any operable position of said second rotatable member along said tractrix surface;
   a gear assembly comprising two or more operably meshing gears, including a first gear, and a second gear having a passage defined by a splined interior surface;
   first connecting means for operably connecting the first gear to the intermediate shaft means such that said first gear is confined to continuous rotation therewith about an axis oriented at an angle relative to the axis of rotation of said intermediate shaft means;
   first splined shaft means extending axially through the second gear and being in meshing engagement with the splined interior surface thereof to thereby permit axial movement of the gear assembly along said first splined shaft means with movement of the second rotatable member along the tractrix surface; and
   positioning means for maintaining a substantially consistent angle between a central axis of rotation of said first splined shaft means and a tangent line on the tractrix surface at a point of friction between a given point on the conical surface and said tractrix surface, for any operable position of said second rotatable member along said tractrix surface, to thereby maintain contact between the conical surface and the tractrix surface along substantially an entire length of said conical surface at said any operable position, such that said axis of rotation of said first splined shaft means moves through various angles of inclination relative to second input/output shaft means, said positioning means including second connecting means for operably connecting the first splined shaft means to said second input/output shaft means such that said first splined shaft means is confined to continuous rotation with said second input/output shaft means at said various angles of inclination relative to said second input/output shaft means.

13. The transmission as defined in claim 12 wherein the gears of the gear assembly consist of said first gear and said second gear such that exterior gear teeth of said first gear mesh with exterior gear teeth of said second gear, wherein respective axes of rotation of said first and second gears are in substantial parallel orientation with the axis of rotation of the first splined shaft means.

14. The transmission as defined in claim 12 wherein the gears of the gear assembly comprise three or more gears having respective axes of rotation which are in substantial parallel orientation with the axis of rotation of the first splined shaft means.

15. The transmission as defined in claim 12 wherein the first and second gears each comprise a gear having exterior bevel gear teeth about an outer perimeter thereof.

16. The transmission as defined in claim 12 wherein the positioning means includes means for maintaining the respective axes of rotation of the first splined shaft means, the gears of the gear assembly, and the second rotatable member in substantially fixed positions relative to each other.

17. The transmission as defined in claim 16 wherein the second connecting means comprises a slidable sleeve/shaft device including a splined shaft member slidably engaged with a splined interior surface of a sleeve member such that said splined shaft member is confined to continuous rotation with said sleeve member, said sleeve/shaft device being operably connected at a first end thereof to the first splined shaft means by a universal joint, an opposing second end of said sleeve/shaft device being configured for attachment to the second input/output shaft means by a universal joint.

18. The transmission as defined in claim 12 wherein the first connecting means comprises a shaft member upon which the first gear is mounted to form an integral part thereof, and a universal joint connecting said shaft member with the first shaft means.

19. The transmission as defined in claim 12 wherein the positioning means operates to position the splined first shaft means such that an imaginary straight line which is substantially perpendicular to said tangent line at said point of friction intersects the axis of rotation of the first splined shaft means at substantially the same point thereon for any operable position of said second rotatable member along said tractrix surface, such that the distance between said point of friction and said point of intersection is substantially constant for any operable position of said second rotatable member along said tractrix surface.

20. A method for making a continuous variable-ratio transmission, said method comprising the following steps:
   (a) selecting a first rotatable member having an exterior tractrix surface of revolution about its axis of rotation defined by a tractrix curve;
   (b) mounting said first rotatable member upon first input/output shaft means such that said first rotatable member is confined to continuous rotation with said first input/output shaft means;
   (c) selecting a second rotatable member having a substantially conical exterior surface of revolution and a shape such that a tangent line on the tractrix surface at a point of friction between a given point on the conical surface and said tractrix surface intersects a central axis of the first rotatable member at a same point of intersection between said central axis of the first rotatable member and a central axis of said second rotatable member, for any operable position of said second rotatable member along said tractrix surface;

(d) mounting said second rotatable member upon intermediate shaft means and placing the conical surface of said second rotatable member in frictional engagement with said tractrix surface such that said second rotatable member is moveable along an axial direction on said tractrix surface;

(e) selecting a gear assembly comprising two or more operably meshing gears, including a first gear, and a second gear having a passage defined by a splined interior surface;

(f) operably connecting the first gear to the intermediate shaft means such that said first gear is confined to continuous rotation therewith about an axis oriented at an angle relative to the axis of rotation of said intermediate shaft means;

(g) extending a first splined shaft means axially through the second gear such that said first splined shaft means is in meshing engagement with the splined interior surface of said second gear to thereby permit axial movement of the gear assembly along said first splined shaft means with movement of the second rotatable member along the tractrix surface;

(h) maintaining a substantially consistent angle between a central axis of rotation of said first splined shaft means and said tangent line on the tractrix surface for any operable position of said second rotatable member along said tractrix surface to thereby maintain contact between the conical surface and the tractrix surface along substantially an entire length of said conical surface at said any operable position, such that said axis of rotation of said first splined shaft means moves through various angles of inclination relative to second input-/output shaft means; and (i) operably connecting the first splined shaft means to said second input/output shaft means such that said first splined shaft means is confined to continuous rotation therewith at said various angles of inclination relative to said second input/output shaft means.

* * * * *